United States Patent
Pettersson et al.

(10) Patent No.: US 10,046,756 B2
(45) Date of Patent: Aug. 14, 2018

(54) METHOD FOR ACCELERATING A HYBRID VEHICLE

(71) Applicant: Scania CV AB, Södertälje (SE)

(72) Inventors: Niklas Pettersson, Stockholm (SE); Mikael Bergquist, Huddinge (SE); Johan Lindström, Nyköping (SE); Anders Kjell, Ekerö (SE); Mathias Björkman, Tullinge (SE)

(73) Assignee: SCANIA CV AB (SE)

( * ) Notice: Subject to any disclaimer, the term of this patent is extended or adjusted under 35 U.S.C. 154(b) by 83 days.

(21) Appl. No.: 14/410,582

(22) PCT Filed: Jun. 26, 2013

(86) PCT No.: PCT/SE2013/050778
§ 371 (c)(1),
(2) Date: Dec. 23, 2014

(87) PCT Pub. No.: WO2014/003660
PCT Pub. Date: Jan. 3, 2014

(65) Prior Publication Data
US 2015/0191166 A1   Jul. 9, 2015

(30) Foreign Application Priority Data
Jun. 27, 2012   (SE) .................................. 1250699

(51) Int. Cl.
*B60W 20/10* (2016.01)
*B60W 20/00* (2016.01)
(Continued)

(52) U.S. Cl.
CPC ......... *B60W 20/1088* (2013.01); *B60K 6/365* (2013.01); *B60K 6/48* (2013.01);
(Continued)

(58) Field of Classification Search
CPC .......... B60W 20/19; B60W 30/18027; B60W 10/108; B60W 20/108; B60W 30/19;
(Continued)

(56) References Cited

U.S. PATENT DOCUMENTS

| | | | |
|---|---|---|---|
| 6,054,776 A | 4/2000 | Sumi | .............................. 290/17 |
| 2004/0168841 A1* | 9/2004 | Ohta | ...................... B60K 6/365 180/65.25 |

(Continued)

FOREIGN PATENT DOCUMENTS

| DE | 10 2005 039 928 A1 | 3/2007 |
|---|---|---|
| DE | 10 2005 039 929 A1 | 3/2007 |

(Continued)

OTHER PUBLICATIONS

International Search Report dated Nov. 8, 2013 in corresponding PCT International Application No. PCT/SE2013/050778.

*Primary Examiner* — Stacey A Fluhart
(74) *Attorney, Agent, or Firm* — Ostrolenk Faber LLP

(57) ABSTRACT

A method for accelerating a vehicle driving forward, in which the vehicle has a propulsion system including a combustion engine with an output shaft (2a), a gearbox (3) with an input shaft (3a), an electric machine (9) comprising a stator and a rotor, and a planetary gear comprising a sun gear (10), a ring gear (11) and a planet wheel carrier (12). When accelerating the vehicle the torque of the electric machine is controlled and the rotational speed of the combustion engine is controlled until the components of the planetary gear have the same rotational speed and may be interlocked.

7 Claims, 4 Drawing Sheets

(51) Int. Cl.
*B60K 6/365* (2007.10)
*B60W 10/08* (2006.01)
*B60K 6/48* (2007.10)
*B60W 10/02* (2006.01)
*B60W 30/18* (2012.01)
*B60W 10/06* (2006.01)
*B60W 10/115* (2012.01)
*B60W 20/19* (2016.01)

(52) U.S. Cl.
CPC ............ *B60W 10/02* (2013.01); *B60W 10/06* (2013.01); *B60W 10/08* (2013.01); *B60W 10/115* (2013.01); *B60W 20/00* (2013.01); *B60W 20/19* (2016.01); *B60W 30/18027* (2013.01); *B60W 2510/1015* (2013.01); *B60W 2710/0644* (2013.01); *B60W 2710/083* (2013.01); *B60Y 2400/421* (2013.01); *Y02T 10/6221* (2013.01); *Y10S 903/93* (2013.01); *Y10T 477/23* (2015.01)

(58) Field of Classification Search
CPC ...... B60W 10/06; B60W 10/11; B60W 10/08; Y10S 903/93; F16H 61/0403; F16H 2061/0422; B60K 6/365
See application file for complete search history.

(56) References Cited

U.S. PATENT DOCUMENTS

| | | | |
|---|---|---|---|
| 2008/0277229 A1 | 11/2008 | Wallner et al. | 192/54.1 |
| 2010/0113202 A1 | 5/2010 | Treichel et al. | 475/5 |
| 2010/0173746 A1* | 7/2010 | Ideshio | B60K 6/365 477/36 |
| 2014/0046562 A1* | 2/2014 | Minami | B60W 10/02 701/67 |

FOREIGN PATENT DOCUMENTS

| | | |
|---|---|---|
| DE | 10 2006 003 724 A1 | 8/2007 |
| DE | 10 2006 003 725 A1 | 8/2007 |
| DE | 10 2006 054 405 A1 | 6/2008 |
| EP | 1 319 546 A1 | 6/2003 |

* cited by examiner

METHOD FOR ACCELERATING A HYBRID VEHICLE

CROSS-REFERENCE TO RELATED APPLICATIONS

The present application is a 35 U.S.C. §§ 371 National Phase conversion of PCT/SE2013/050778, filed Jun. 26, 2013, which claims priority of Swedish Patent Application No. 1250699-4, filed Jun. 27, 2012, the contents of which are incorporated by reference herein. The PCT International Application was published in the English language.

FIELD OF THE INVENTION AND PRIOR ART

The present invention relates to a method for accelerating a vehicle driving forward wherein the method is started when the vehicle is driving forward.

The invention is especially but not exclusively directed to carrying out such a method for motor vehicles in the form of wheeled utility vehicles, especially heavy vehicles, such as trucks and buses.

Accordingly, the invention relates to a method for accelerating a hybrid vehicle driving forward, such vehicle is generally a vehicle which may be driven by a primary engine, here a combustion engine, and by a secondary engine, here an electric machine. The electric machine is suitably provided with means for storing energy, such as a battery or a capacitor for storing electric energy, and with regulating equipment for regulating the flow of electrical energy between the storing means and the electric machine. The electric machine may by this flow operate as a motor or a generator, depending upon the state of operation of the vehicle. When the vehicle is braked, the electric machine generates electrical energy which may be stored, and the electrical energy stored may later be utilized for, for example, driving the vehicle.

The utilization of a conventional clutch mechanism disconnecting the input shaft of the gearbox with respect to the combustion engine during the gearchanging process in the gearbox results in disadvantages, such as heating of the discs of the clutch mechanism, which results in an increased fuel consumption and wear of the clutch discs. Considerable losses are then also caused when starting the vehicle. Furthermore, a conventional clutch mechanism is comparatively heavy and costly. It requires also a comparatively large space in the vehicle. Friction losses are also created when using a hydraulic converter/torque transformer usually used in automatic gearboxes. The conventional clutch mechanism and the disadvantages associated therewith may be avoided by providing that vehicle with a propulsion system in which the output shaft of the combustion engine, the rotor of the electric machine and the input shaft of the gearbox are interconnected by a planetary gear. A vehicle having a propulsion system of this type is known through EP 1 319 546.

There is of course an ongoing attempt to improve the way to drive a vehicle having such a propulsion system with respect to energy efficiency and to regenerate as much as possible of the brake energy when braking the vehicle.

SUMMARY OF THE INVENTION

The object of the present invention is to provide a method of the type defined in the introduction hereof.

By controlling the electric machine with respect to torque and controlling the combustion engine with respect to rotational speed during the entire method, the first rotational speed and the rotation of the first component connected to the output shaft of the combustion engine will approach each other until the interlocking may take place. This occurs without any torque interruption in the drivetrain formed by the propulsion system of the vehicle. The driver of the vehicle will not notice the transfer from a free to a locked planetary gear through the method. Reasons for a transfer from free to locked planet gear may, for example, be that from the energy point of view, it is more advantageous to drive in the locked position in the existing driving situation or else energy stored for driving the electric machine starts to run out.

According to an embodiment of the invention the method is carried out for a vehicle having a propulsion system with the sun gear as the first component and the ring gear as the third component. Such a propulsion system is described in unpublished SE 1051384-4. It has a number of advantages with respect to a propulsion system according to EP 1 319 546 mentioned above, which has the ring gear as the first component and the sun gear as the third component. A compact construction making it easy to build in spaces that already exist for drive trains (propulsion systems) having clutch mechanisms instead of planetary gears is obtained by connecting the electric machine with the ring gear and the output shaft of the combustion engine with the sun gear. A hybridized gearbox may by this be made of a size and weight compatible with a standard gearbox and standardized interfaces may be maintained. This means that the weight increase normally associated with a hybridization may be reduced considerably. Another advantage is that a connection of the electric machine with the ring gear means a higher possible brake torque through this than would be obtained if the electric machine is instead connected to the sun gear.

According to another embodiment of the invention, the rotational speed of the input shaft of the gearbox is measured in a step and the combustion engine is controlled to change the rotational speed the combustion engine in the direction towards this rotational speed. This provides a comparatively simple and reliable control of the combustion engine to the state in which the locking means may be transferred to the locking position.

According to another embodiment of the invention, the method is started in a state of the propulsion system with a rotational speed of the first component being lower than a first rotational speed, and the combustion engine is controlled to increase its rotational speed in the direction towards the first rotational speed. The rotational speed of the first component which is connected to the output shaft of the combustion engine is usually lower than the first rotational speed, and by then controlling the combustion engine to increase its rotational speed for obtaining the locking position, the combustion engine contributes to the requested acceleration of the vehicle.

According to another embodiment of the invention the sun gear and the planet wheel carrier are interlocked. This is an advantageous position for carrying out their interlocking. Less torque is transferred by this through the planetary gear wheels. Only the torque of the electric machine is then transferred through these gear wheels.

The invention also relates to a computer program in a computer program product having the features disclosed herein and an electronic control unit having the features disclosed herein.

Other advantageous features and advantages of the invention appear from the description following below.

BRIEF DESCRIPTION OF THE DRAWINGS

With reference to the appended drawings, below follows a specific description of an embodiment of the invention cited as an example.

In the drawings.

DETAILED DESCRIPTION OF AN EMBODIMENT OF THE INVENTION

Figure 1:
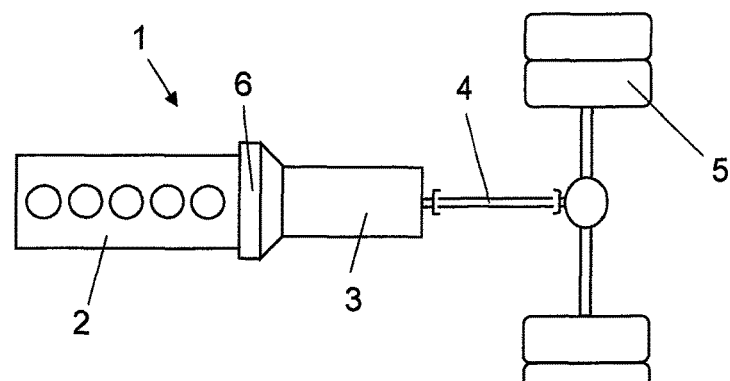
FIG. 1 is a very simplified view of a drivetrain of a vehicle for which a method according to the invention may be carried out.
Figure 2:
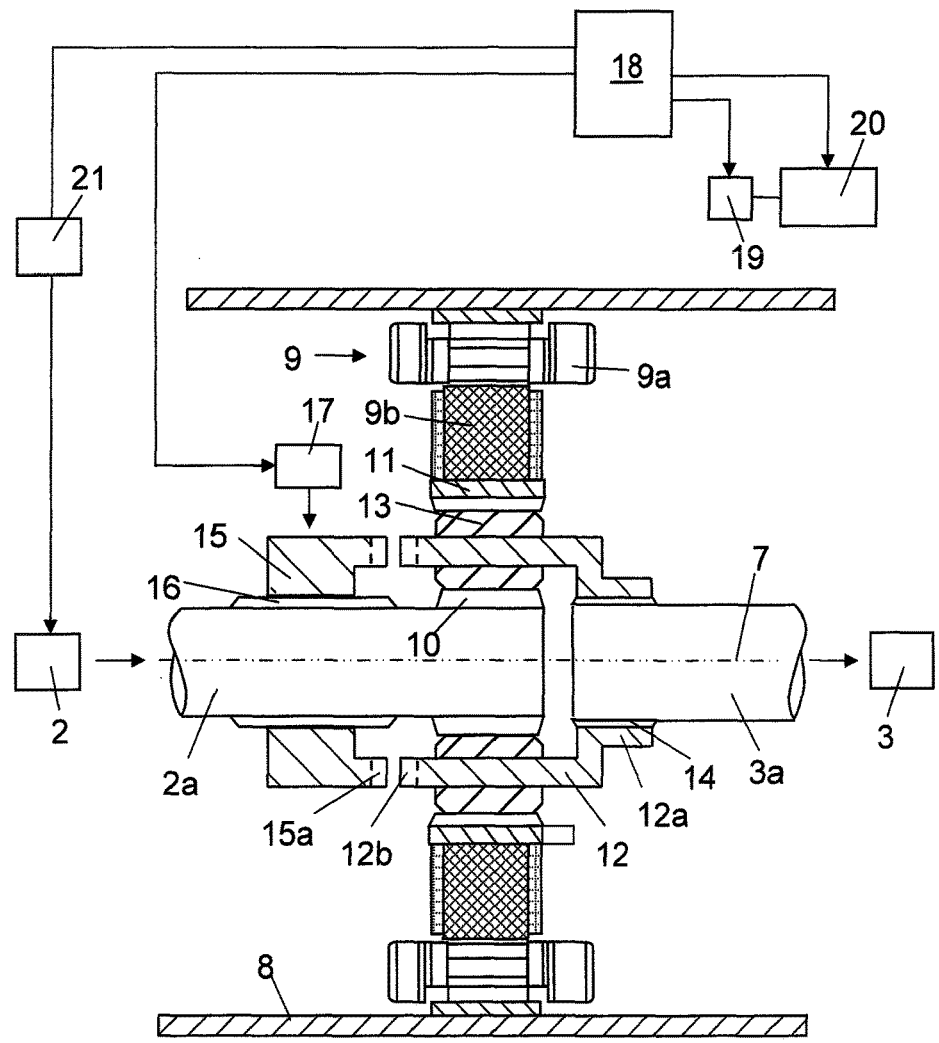
FIG. 2 is a still simplified but more detailed view of a part of a said propulsion system.

FIG. 1 shows a drivetrain for a heavy vehicle 1. The drivetrain comprises a combustion engine 2, a gearbox 3, a number of drive shafts 4 and drive wheels 5. The drivetrain has between the combustion engine 2 and the gearbox 3 an intermediate portion 6. FIG. 2 shows in more detail the components in the intermediate portion 6. The combustion engine 2 is provided with an output shaft 2a and the gearbox 3 with an input shaft 3a in the intermediate portion 6. The output shaft 2a of the combustion engine is arranged coaxially with respect to the input shaft 3a of the gearbox. The output shaft 2a of the combustion engine and the input shaft 3a of the gearbox are arranged to rotate around a common rotation axis 7. The intermediate portion 6 comprises a housing 8 enclosing an electric machine 9 and a planetary gear. The electric machine 9 comprises as usual a stator 9a and a rotor 9b. The stator 9a comprises a stator core secured in a suitable way on the inner side of the housing 8. The stator core comprises stator windings. The electric machine 9 is adapted to in certain operation situations utilize electric energy stored for supplying drive power to the input shaft 3a of the gearbox and in other operation situations utilize kinetic energy of the input shaft 3 of the gearbox for generating and storing electric energy.

The planetary gear is arranged substantially radially internally of the stator 9a and the rotor 9b of the electric machine. The planetary gear comprises as usual a sun gear 10, a ring gear 11 and a planet wheel carrier 12. The planet wheel carrier 12 carries a number of gear wheels 13 rotatably arranged in a radial space between the teeth of the sun gear 10 and the ring gear 11. The sun gear 10 is secured to a circumferential surface of the output shaft 2a of the combustion engine. The sun gear 10 and the output shaft 2a of the combustion engine rotate as a unit with a first rotational speed $n_1$. The planet wheel carrier 12 comprises a fastening portion 12a fastened to a circumferential surface of the input shaft 3a of the gearbox by means of a splined connection 14. The planet wheel carrier 12 and the input shaft 3a of the gearbox may by means of this connection rotate as a unit with a second rotational speed $n_2$. The ring gear 11 comprises an external circumferential surface onto which the rotor 9b is secured. The rotor 9b and the ring gear 11 form a rotatable unit rotating with a third rotational speed $n_3$.

The propulsion system comprises a locking means. The output shaft 2a of the combustion engine is provided with a displaceable coupling member 15. The coupling member 15 is fastened to the output shaft 2a of the combustion engine by means of a splined connection 16. The coupling member 15 is in this case fixed against rotation to the output shaft 2a of the combustion engine and displaceable in the axial direction on the output shaft 2a of the combustion engine. The coupling member 15 comprises a coupling portion 15a connectable to a coupling portion 12b of the planet wheel carrier 12. A displacing member 17 schematically shown displaces the coupling member 15 between a first position, in which the coupling portions 15a, 12b are not mutually engaged which corresponds to a releasing position of the locking means and a to a second position in which the coupling portions 15a, 12b are mutually engaged which correspond to a locking position of the locking, the output shaft 2a of the combustion engine and the input shaft 3a of the gearbox will in this locking position be interlocked and these and the rotor of the electric machine will by that rotate with the same rotational speed. This state may be called locked planet.

The locking mechanism may also comprise a sleeve provided with first splines which in the releasing position engage second splines on a first component of the planetary gear and in the locking position engage third splines on a second component of the planetary gear. The first component is in this case preferably the planet wheel carrier and the second component the sun gear. The locking mechanism may then be designed as a sleeve with a ring shape enclosing the planet wheel carrier substantially concentrically.

An electric control unit 18 is designed to control the displacing member 17. The control unit 18 is also configured to decide on which occasions the electric machine shall operate as a motor and on which occasions it shall operate as a generator. The control unit 18 may for deciding this receive current information about suitable operation parameters. The control unit 18 may be a computer with software for this task. The control unit 18 controls a regulating equipment 19 schematically shown, which regulates the flow of electric energy between a hybrid battery 20 and the stator windings 9a of the electric machine. On occasions when the electric machine 9 operates as a motor stored electric energy is supplied from the hybrid battery 20 to the stator 9a. On occasions on which the electric machine operates as a generator, electric energy is supplied from the stator 9a to the hybrid battery 20. The hybrid battery 20 delivers and stores electric energy with a voltage being on the order of 200-800 volts. Since the intermediate portion 6 between the combustion engine 2 and the gearbox 3 in a vehicle is restricted, it is required that the electric machine 9 and the planetary gear constitute a compact unit. The components 10, 11, 12 of the planetary gear are here arranged substantially radially internally of the stator 9a of the electric machine. The rotor 9b of the electric machine, the ring gear 11 of the planetary gear, the output shaft 2a of the combustion engine and the input shaft 3a of the gearbox are here arranged to rotate around a rotation axis 5 in common. Through such a design, the electric machine 9 and the planetary gear occupy a comparatively small space. The vehicle 1 is provided with a motor control function 21 through which the rotational speed $n_1$ of the combustion engine 2 may be regulated. Therefore, the control unit 18 has a possibility to activate the motor control function 21 and create a state of zero torque in the gearbox when gears in the gearbox 3 are engaged and disengaged. Instead of being controlled by one single control unit 18, the propulsion system may of course be controlled by several different control units.

Figure 4:
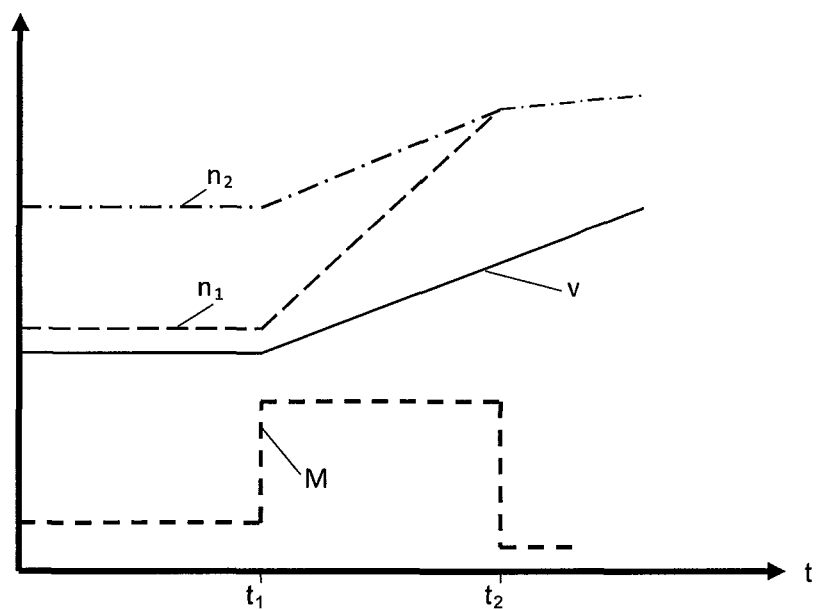
FIG. 4 shows how the rotational speed for a combustion engine shaft is connected to the planetary gear of the propulsion system according to FIG. 2 and the input shaft to the gearbox and the vehicle speed and the torque of the electric machine vary over time when carrying out a method according to an embodiment of the invention for accelerating a vehicle driving forward.
Figure 5:
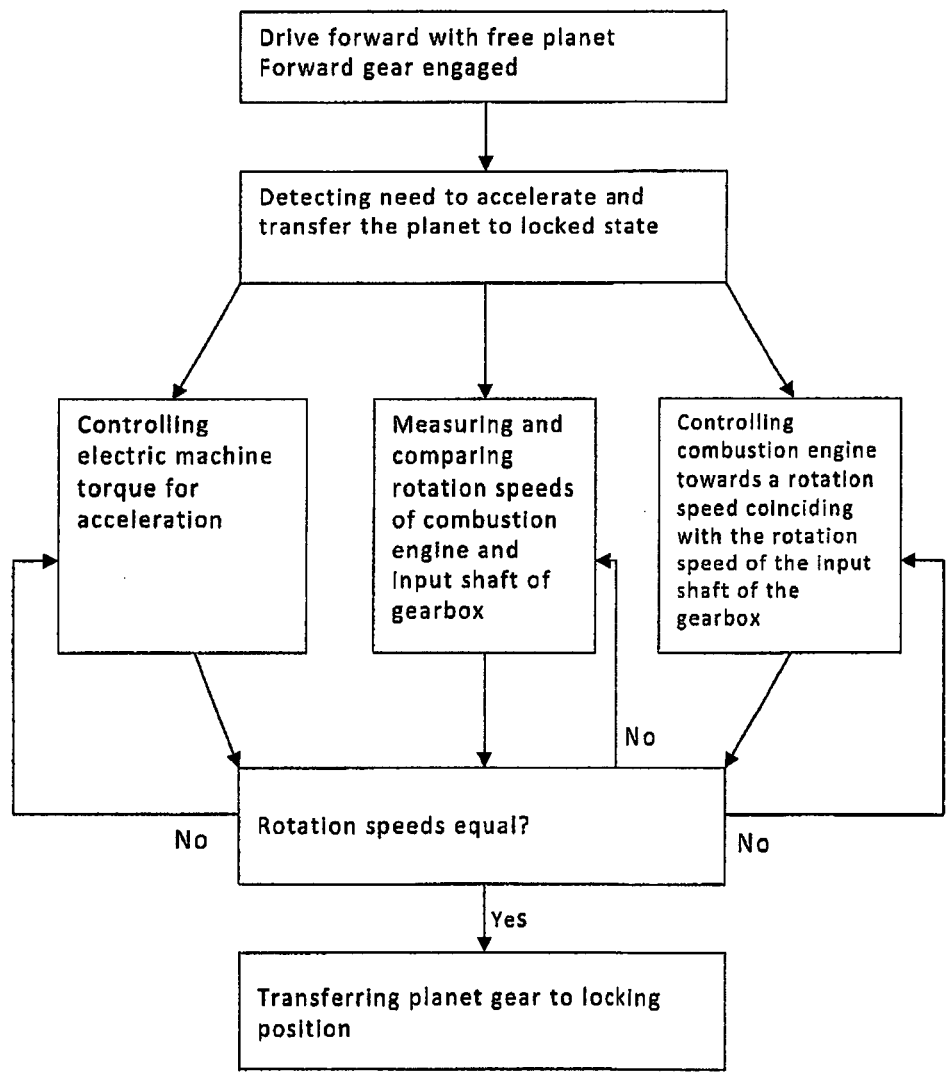
FIG. 5 is a flow chart illustrating a method according to an embodiment of the invention.

FIG. 5 shows a flow chart illustrating a method according to an embodiment of the present invention for accelerating a vehicle driving forward, in which this vehicle has a propulsion system of the type shown in FIG. 2. Reference is at the same time made to FIG. 4, where the rotational speeds of the output shaft of the combustion engine and the input shaft of the gearbox $n_1$ and $n_2$, respectively, the speed v of the vehicle and the torque M of the electric machine are plotted versus the time for carrying out this method.

The vehicle is driven forward with the locking means in the releasing position and a forward gear engaged when the method is started. This means that all three components of planetary gear are allowed to rotate with different rotational speeds. The reason for driving the vehicle in this way may for example be that a gear-change has taken place in the gearbox, which had been advantageous to carry out with the planetary gear in the released state or that the vehicle is driven with a comparatively high speed and the combustion engine is driven at low rotational speeds since this is advantageous from the energy consumption point of view. A need to accelerate the vehicle and change to drive with the planetary gear in the locking position is then detected, for example because the energy level in a battery providing the electric machine with energy starts to run out.

The method is then started by the control unit 18, which at the time $t_1$ controls the electric machine 9 to deliver a torque M corresponding to the product of on one hand the propulsion system torque requested for the acceleration and on the other the transmission ratio of the planetary gear. The transmission ratio of the planetary gear is in this case the number of teeth of the ring gear/(the number of teeth of the sun gear+the number of teeth of the ring gear). The rotational speed $n_2$ of the input shaft of the gearbox is at the same time measured and the combustion engine is controlled to change the rotational speed $n_1$ in the direction towards the rotational speed of the input shaft of the gearbox.

The rotational speeds $n_1$ and $n_2$ are at the time $t_2$ substantially equal, and the locking means is then transferred to the locking position by displacing the coupling member 15, whereupon the sun gear, the ring gear and the planet wheel carrier of the planetary gear will rotate with the same rotational speed and the vehicle will drive as if the planetary gear does not exist. Substantially equal means here that the difference between the rotational speeds is so small that an interlocking may take place.

Computer program code for implementing a method according to the invention is suitably included in a computer program which is readable into a non-volatile internal memory of a computer, such as the internal memory of an electronic control unit of a motor vehicle. Such a computer program is suitably provided through a computer program product comprising a non-volatile data storing medium readable by an electronic control unit, which data storing medium has the computer program stored thereon. Said data storing medium is for example an optical data storing medium in the form of a CD-ROM-disc, a DVD-disc, etc., a magnetic data storing medium in the form of a hard disc, a diskette, a tape etc., or a Flash memory or a memory of the type ROM, PROM, EPROM or EEPROM.

Figure 3:
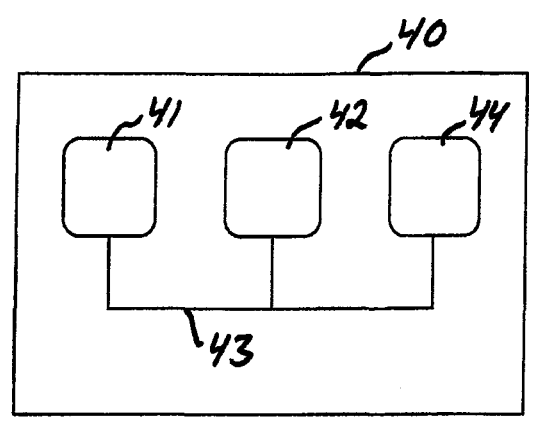
FIG. 3 is a principle sketch of an electronic control unit for implementing a method according to the invention.

FIG. 3 illustrates very schematically an electronic control unit 40 comprising an execution means 41, such as a central processor unit (CPU), for executing a computer program. The execution means 41 communicates with a non-volatile memory 42, for example of the type RAM, through a data bus 43. The control unit 40 comprises also a data storing medium 44, for example in the form of a Flash memory or a memory of the type ROM, PROM, EPROM or EEPROM. The execution means 41 communicates with the data storing medium 44 through a data bus 43. A computer program comprising computer program code stored in the non-volatile memory for implementing a method according to the invention, for example in accordance with the embodiment illustrated in FIG. 5, is stored on the data storing medium 44.

The invention is of course not in any way restricted to the embodiments described above, but many possibilities to modifications thereof would be apparent to a person with skill in the art without departing from the scope of the invention as defined in the appended claims.

The locking means may be designed to interlock any two of said three components.

A transmission could be arranged between the rotor and the ring gear and also between the output shaft of the combustion engine and the sun gear, such as upstream of the shaft shown in the figures to be connected to the sun gear. The transmission last mentioned could also be formed by a variable gear.

It is also conceivable that the method is carried out for a vehicle having the ring gear as the first component and the sun gear as the third component, although the opposite would probably often be preferred through the advantages thereof mentioned above.

It is possible that the component connected to the output shaft of the combustion engine has a higher rotational speed than said first rotational speed when the method is started, and the first rotational speed could also be chosen to be the rotational speed of the component connected to the electric machine.

The invention claimed is:

1. A method for accelerating a vehicle driving forward, wherein the vehicle has a propulsion system comprising a combustion engine with an output shaft, a gearbox with an input shaft, an electric machine comprising a stator and a rotor, and a planetary gear comprising three components in the form of a sun gear, a ring gear and a planet wheel carrier;

the output shaft of the combustion engine is connected to one of the three components of the planetary gear so that rotation of the output shaft causes rotation of the one of the three components, the input shaft of the gearbox is connected to another one of the three components of the planetary gear so that rotation of the input shaft causes rotation of the another one of the three components, and the rotor of the electric machine is connected to the remaining one of the three components of the planetary gear so that rotation of the rotor causes rotation of the remaining one of the components;

the propulsion system further comprising locking means comprising a displaceable coupling transferable between a locking position in which two of the three components are interlocked, so that the three components rotate with the same rotational speed, and a releasing position in which the three components are allowed to rotate with different rotational speeds;

the method comprising:

accelerating the vehicle when the vehicle is being driven forward by, a) controlling the electric machine to deliver a torque corresponding to a product of the propulsion system torque requested for the acceleration and a transmission ratio of the planetary gear with the locking means in the releasing position, b) with the locking means in the releasing position and at the same time as step a) measuring a first rotational speed of the input shaft of the gearbox and controlling the combustion engine with an electric control unit to change the rotational speed of the combustion engine in the direction towards the first rotational speed, and c) transferring the locking means to the locking position when the rotational speed (n1) of the combustion engine is substantially equal to the first rotational speed (n2), wherein the vehicle propulsion system includes the sun gear as the one of the three components and the ring gear as the remaining one of the three components that is accelerated, and wherein the locking means, when in the locking position, is connected to a coupling of the planet wheel carrier, which is connected to the transmission.

2. A method according to claim 1, further comprising in step b), measuring the rotational speed (n2) of the input shaft of the gearbox and controlling the combustion engine to change its rotational speed (n1) in the direction towards the rotational speed of the input shaft.

3. A method according to claim 1, further comprising starting the method in a state of the propulsion system with a rotational speed (n1) of the first component being lower than the first rotational speed (n2), and in step b), controlling the combustion engine to increase the rotational speed thereof in the direction towards the first rotational speed.

4. A method according to claim 1, further comprising in step c) interlocking the sun gear and the planet wheel carrier.

5. A computer program product comprising a non-volatile data storing medium readable by a computer the data storing medium storing a computer program comprising computer program code which causes a computer to implement a method according to claim 1 when the computer program code is executed in the computer.

6. An electronic control unit of a motor vehicle comprising execution means, a non-volatile memory connected to the execution means and a data storing medium connected to the execution means, and the computer program code of a computer program product according to claim 5 is stored on the data storing medium.

7. A vehicle comprising an electronic control unit according to claim 6.

* * * * *